Feb. 23, 1926.
E. T. FERNGREN
1,574,739
METHOD AND APPARATUS FOR DELIVERING MOLTEN GLASS
Original Filed Sept. 29, 1913
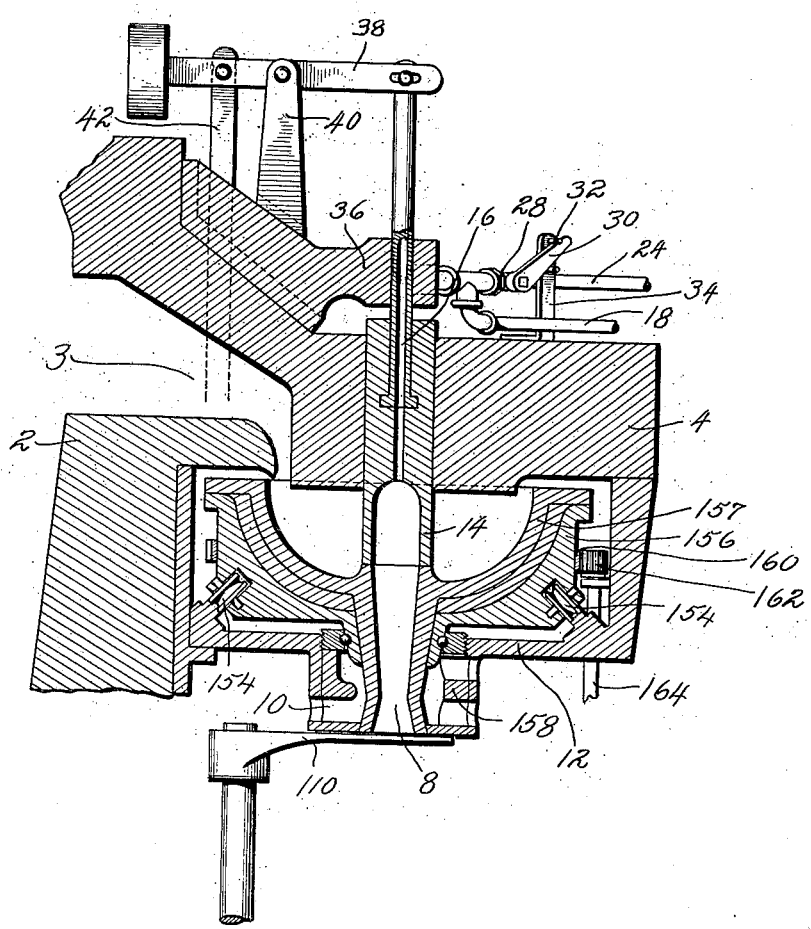
INVENTOR.
E. T. FERNGREN,
BY *Dorsey & Cole*
ATTORNEYS.

Patented Feb. 23, 1926.

1,574,739

UNITED STATES PATENT OFFICE.

ENOCH THEODORE FERNGREN, OF TOLEDO, OHIO, ASSIGNOR TO HARTFORD-FAIRMONT COMPANY, A CORPORATION OF NEW YORK.

METHOD AND APPARATUS FOR DELIVERING MOLTEN GLASS.

Original application filed September 29, 1913, Serial No. 792,383. Renewed February 10, 1919, Serial No. 276,175. Divided and this application filed September 19, 1925. Serial No. 57,454.

*To all whom it may concern:*

Be it known that I, ENOCH THEODORE FERNGREN, now a citizen of the United States of America, and once a citizen of Sweden, late of Washington, D. C., but now of Toledo, in the county of Lucas and State of Ohio, have invented certain new and useful Improvements in Methods and Apparatus for Delivering Molten Glass, of which the following is a specification.

My invention relates to the art of feeding and delivering molten glass, and the present application is a division of my co-pending application for Letters Patent filed February 10, 1919, Serial No. 276,175, as a renewal of my prior application filed September 29, 1913, Serial No. 792,383.

The object of this invention is to provide a novel and effective method of increasing the homogeneity of molten glass at the time when the glass is discharged from a receptacle, and to provide suitable apparatus, of novel construction, for carrying out this method.

In the specific embodiment of my invention shown and described herein by way of example, molten glass is delivered from a melting tank into a rotary receptacle or bowl, having a submerged discharge outlet at the vertical axis about which the bowl is rotated, and the discharge of the glass through this outlet is regulated by means of a vertically reciprocating implement projecting down into the glass in alignment with the outlet.

In the accompanying drawing, Fig. 1 is a vertical sectional view taken centrally through the rotary bowl of an apparatus constructed in accordance with my invention, some of the associated parts being omitted. The structure shown in this drawing is found in Figures 2, 7 and 14 of my co-pending application mentioned above.

In the drawing, a glass furnace 2 is shown as provided with an extension 3 through which the molten glass is delivered into a rotary bowl or feed reservoir 156, lined with refractory material 157, and mounted on roller bearings 154. The bowl 156 has an axial discharge outlet consisting of a nozzle 8 which, as shown, is formed integral with the bowl and is heated through openings 10 in a separate casing 158, through which the flame from a blow torch or other heating means, not shown, may be directed against the stem of the nozzle when it is necessary to maintain the molten condition of the glass in the nozzle. The bowl is provided externally with a gear 160 which meshes with a gear 162 on a shaft 164 which may be driven in any convenient manner. By thus rotating the bowl, the glass therein is commingled and maintained at an even heat and of uniform fluid consistency throughout, and issues in such uniform consistency from the discharge opening of the bowl.

A metallic shell 12 is provided for enclosing the bowl 156 and the outer portion of the nozzle 8 with the exception of its discharge opening and the openings 10.

Operating within the bowl 156 and mounted slidingly through the cover member 4 is a vertically reciprocating implement or air bell 14, the lower end of which may fit the upper or inner end of the nozzle 8 for the purpose of segregating a charge of the glass for every operation of the bell. The interior of the bell is placed in communication, through a tube 16, a pipe 18, and a valve 20, with a source of compressed air, not shown, whereby upon operation of the valve, the force of compressed air may be made one factor in ejecting the glass charges out through the nozzle 8. The tube 16 is also in communication, through a valve 28 and a pipe 24, with a vacuum pump, not shown, whereby, upon operation of the valve 28, a partial vacuum may be created in the bell. The valve 28 is provided with a crank 30 for engagement with pins 32 on a bracket 34 supported on the cover member 4, so that the valve is opened and closed in response to the reciprocating movements of the air bell.

The tube 16 is slidingly mounted in the end of an arm 36 which overhangs the cover member 4, and the upper end of the tube is pivotally and slidingly connected to one end of a counter-balanced arm 38 which is pivoted in a bracket 40 carried by the arm 36. The arm 38 is connected by a link 42 to any convenient mechanism for reciprocating the link 42 and thereby lifting and lowering the air bell 14 periodically. Such reciprocating mechanism may, for example, be such as is shown and described in my above-mentioned application of which the present application is a division.

Shears 110 operate beneath the nozzle 8 in timed relation to the reciprocation of the air bell, to sever mold charges from the discharged glass. These shears are pivotally mounted on a bearing stand 82 and are periodically opened and closed by suitable mechanism, which may be such as is described in my co-pending application referred to above. It is not considered necessary to repeat such description here, inasmuch as any desired severing mechanism may be used.

In operation, glass from the furnace 2 flows into the rotating bowl 156, and the glass in the bowl is set in motion around the axis of the discharge nozzle 8, with the result that the glass is thoroughly commingled and rendered uniform in temperature and consistency. This mixing action is assisted by the resistance offered by the non-rotating air bell implement 14 to the circulatory movement of the glass. The discharge of glass through the nozzle 8 is controlled by periodically lifting and lowering the air bell 14. The shears 110 are closed at the proper time to cut off the discharged glass.

From the foregoing, it is believed that the operation of the apparatus will be clear without a more extended explanation. I do not desire to be restricted to the exact details of construction shown and described, but reserve the right to all changes falling within the spirit and scope of the appended claims.

What I claim is:—

1. The hereinbefore described method of feeding molten glass in a homogeneous condition from a supply body through a submerged outlet, which comprises the step of causing a rotary motion of glass in the supply body above and around the outlet.

2. The combination of a receptacle to contain molten glass, said receptacle provided with an outlet orifice, and automatic means to cause an equalization of temperature within the receptacle comprising mechanism for rotating the receptacle about the axis of said orifice.

3. In an apparatus for discharging molten glass, the combination of a receptacle for the glass having a submerged discharge outlet, and means for imparting complete rotation to the receptacle around the outlet.

4. In an apparatus for discharging molten glass, the combination of a receptacle for the glass having a submerged discharge outlet, means for imparting complete rotation to the receptacle around the outlet, and severing means operating periodically to sever the glass discharged from said outlet.

5. In means for feeding glass to molds or other containers, the combination of a rotatable receptacle adapted to contain a supply of molten glass, and provided with a discharge orifice axial to its rotary movement, means for supplying glass to said receptacle eccentrically to said orifice, and means for rotating said receptacle to provide homogeneity in the glass contained therein.

6. In means for feeding glass to molds or other containers, the combination of a completely rotatable receptacle adapted to contain a supply of molten glass, and provided with a discharge orifice axial to its rotary movement, means for supplying glass to said receptacle eccentrically to said orifice, and means for rotating said receptacle to provide homogeneity in the glass contained therein.

7. The combination of a receptacle for molten glass having a discharge opening in the bottom thereof, a regulator working in the glass over said opening to control the discharge of glass, means for causing a flow of glass into the receptacle, and means to cause a movement of the glass in the receptacle relative to the point at which the glass flows into the receptacle, and around the axis of the discharge opening.

8. The combination of a receptacle for molten glass having a discharge opening in the bottom thereof, a regulator working in the glass over said opening to control the discharge of glass, means for causing a flow of glass into the receptacle, and means to cause a movement of the receptacle relative to the point at which the glass flows into the receptacle, and around the axis of the discharge opening.

9. The combination of a receptacle to contain molten glass, said receptacle provided with a central outlet orifice, means to continuously supply molten glass to said receptacle at one side of said orifice and automatic means to continuously rotate said receptacle about the vertical axis of said orifice.

10. The combination with a tank to contain molten glass, of a revolving pot, a plunger mounted to reciprocate in said pot, a cutter and automatic means to actuate said parts in synchronism to produce charges of glass.

11. In apparatus for feeding molten glass, the combination of a receptacle for molten glass said receptacle comprising a rotary bowl provided with a downwardly directed submerged opening, and means operating periodically on the glass within the receptacle to control the discharge of glass from said opening.

12. In means for feeding glass to molds or other containers, the combination of a receptacle adapted to contain a supply of molten glass and provided with a discharge orifice, means for moving said receptacle, and a tool inserted in the glass in said receptacle and resisting the movement of the glass imparted by the movement of the receptacle, whereby the glass is intermingled to produce homogeneity.

13. In a device for feeding molten glass, the combination of a receptacle for molten glass provided with a submerged discharge outlet, a member operating within the receptacle to control the discharge of glass from the outlet, and means for producing a relative rotary motion between said receptacle and said member.

14. In apparatus of the class described, the combination of a receptacle for molten glass provided with a downwardly directed discharge opening, a hollow cylindrical member vertically suspended in said receptacle above said discharge opening, and means for causing relative rotation between the receptacle and the member.

15. In apparatus for separating molten glass into mold charges, the combination of a receptacle having a submerged discharge outlet, a member within the receptacle having a chamber opening toward the outlet and having its lower end submerged in the glass, means for producing a relative rotary motion between the receptacle and the member, means operating periodically to sever the discharged glass, and automatic means operating in a predetermined order and time for creating differential pressures within the chamber to control the discharge of glass from the outlet.

In testimony whereof I hereunto affix my signature.

ENOCH THEODORE FERNGREN.